Feb. 18, 1958          J. A. STUMP          2,823,584
REFLECTOR FOR VIEWING MARKER WHEEL
Filed Feb. 11, 1953
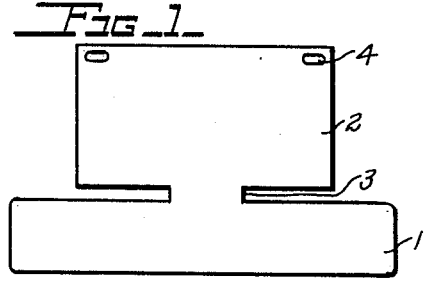
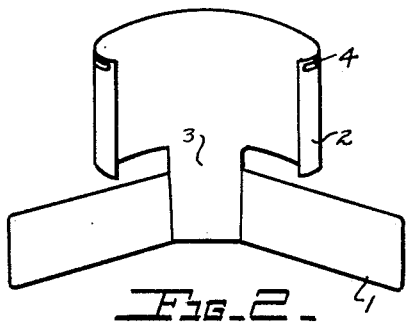
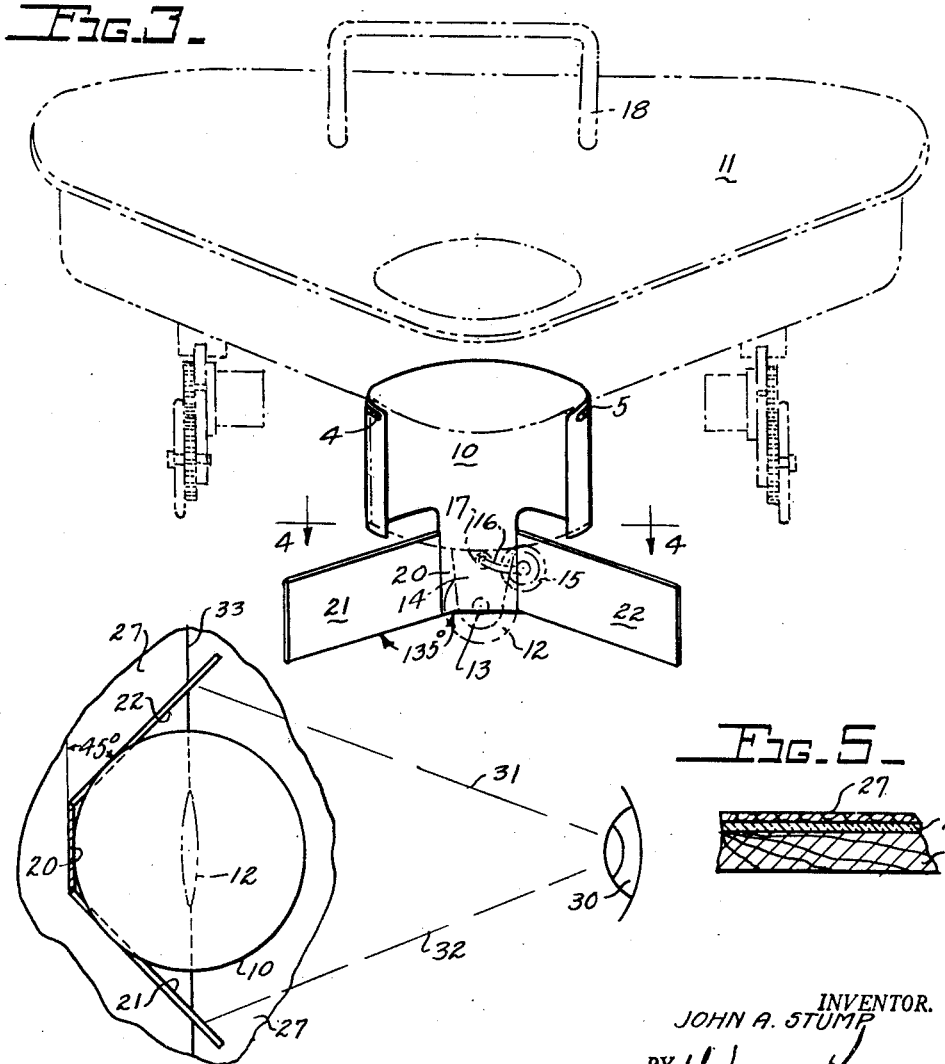
INVENTOR.
JOHN A. STUMP
BY *Wade Koontz*
AND *Orlando L. Mason*
ATTORNEYS

United States Patent Office 2,823,584
Patented Feb. 18, 1958

2,823,584

REFLECTOR FOR VIEWING MARKER WHEEL

John A. Stump, Covington, Ohio, assignor to the United States of America as represented by the Secretary of the Air Force Application February 11, 1953, Serial No. 336,462

1 Claim. (Cl. 88—85)

(Granted under Title 35, U. S. Code (1952), sec. 266)

The invention described herein may be manufactured and used by or for the Government for governmental purposes without payment to me of any royalty thereon.

This invention relates to reflecting devices and more particularly to a reflector applied to an object moving in a direction that is more or less normal to the line of sight of an observer.

In the ground training of novice airmen in a Link trainer, the instructor is seated at his desk or table on the top of which is a chart or map over which the student moves an automatic recorder that makes of record the performance of the trainee within the Link trainer acting in response to directions from the instructor. The recorder is connected electrically with the trainer and accurately traces on the chart or map the course flown over by the student in the trainer. The course recorder is supported on three wheels, two of which are driver wheels and the third wheel is an idler that is equipped with an inking roller. The idler tracer inking wheel applies ink to the chart or map as a track record of the trainee's simulated flight as he works the controls of the simulated aircraft from within its cockpit.

In the past, as the trainee causes the recorder to move about over the chart on the instructor's desk, the instructor has experienced considerable difficulty in observing the degree of accuracy in depth as the trainee causes the inked recorder wheel to move in directions more or less normal to the instructor's line of sight.

The present invention provides a reflector for being mounted on the recorder just back of the inking wheel in such a manner as to make available to the instructor images of the recorder wheel on the chart or map, or on a glass above the chart or map, and these images are of particular value to the instructor when the direction of the motion of the inking wheel is to the right or left of the instructor.

An object of the present invention is to provide a reflector for the inking wheel on a Link trainer recorder. By means of the reflector, images of the contact point of the reflector wheel with respect to the object over which it is being moved are of particular value when the direction of the motion of the inking wheel is normal to the line of sight of the instructor.

An illustrative embodiment of the present invention is shown in the accompanying drawing wherein:

Figure 1 is a plan view of a blank stamped out of sheet metal that embodies the present invention;

Figure 2 is a perspective view of the blank shown in Figure 1 shaped for mounting on a Link trainer recorder;

Figure 3 is a perspective view of the reflector shown in Figure 2 mounted by screws on a Link trainer recorder shown in phantom, so that the mirror portion of the shaped blank is positioned back of the inking wheel of the recorder;

Figure 4 is a section of the reflector taken along the line 4—4 of Figure 3 with a sighting diagram indicated; and Figure 5 is a fragmental section of the top of an instructor's table, not shown.

The reflecting device shown in the accompanying drawing comprises a reflector 1 and a securing portion 2 joined by a connector 3. The reflector 1 has a desired contour, such as being in a single plane as shown in Figure 1, or bent at the lateral edges of the connector 3 to provide three plane reflecting surfaces as shown in Figure 2, or curved in a concave or a convex manner as preferred for a particular installation. The securing portion 2 is provided with suitable apertures 4 so that it may be secured by screws 5 as a collar outwardly of a cylindrical portion 10 of the recorder 11.

The recorder 11 is provided with an inking wheel 12 journalled on a shaft 13 between forks 14 of a shaft that is journalled in the recorder cylindrical portion 10. An ink loaded wheel 15 is journalled on one end of a substantially U-shaped wire shaft 16 that has its opposite end removably inserted in an aperture 17 in the nearer ear 14. The inking wheel 15 is of felt and is soaked with printing ink. The ink is replenished from time to time as needed. The inking wheel 15 has a groove in its felt periphery that rests downwardly against and applies ink to the edge of the inking wheel 12. The recorder is provided with a handle 18 for ease of handling.

A preferred form of the reflector shown in Figures 2 and 3, comprises a plane middle reflecting face 20, flanked on either side by wings or plane reflecting faces 21 and 22. The lateral plane reflecting faces 21 and 22 illustratively extend away from the plane of the middle face 20 at oppositely directed angles of 135°.

The recorder is adapted for being positioned on a table 25. The table 25 is provided with a glass top 26 on which may be secured a chart or map 27. The recorder inking wheel 12 marks a flight course on the chart or map 27 depending upon the operation of controls within the Link trainer and manipulated by the trainee. For some purposes the glass 26 is positioned above the chart or map 27 on the table 25 and the recorder inking wheel 12 then applies its record to the upper surface of the glass 26.

In Figure 4 of the accompanying drawing, an instructor's position is represented by the eye 30 that perceives along lines of sight 31 and 32 images of the contact point of the inking wheel 12 with the chart or map 27. Particularly of interest is the proximity of that contact point with a line on the chart, such as the line 33 on the chart or map 27, so that the instructor may observe with an increased degree of accuracy, the precision in depth particularly with which the trainee within the Link trainer is following a particular flight path, as in a simulated landing operation or the like. This matter is of particular interest when the glass 26 is on top of the chart or map 27 because of the parallax resulting therefrom.

The reflector shown and described herein is submitted for the purposes of illustrating and describing an operative embodiment of the present invention and may be modified somewhat for particularly desirable characteristics without departing from the scope of the present invention:

What I claim is:

A reflecting device for improving the visibility of the marker wheel trace of the marker wheel of an aviation ground training recorder in which the marker wheel is pivotally mounted for rotating about a vertical steering axis and freely rotatable about a horizontal axis for rotation over a recording surface and including a stationary frame element which remains with a fixed orientation with respect to the recording surface; the reflecting device including a first portion secured to the stationary frame element of the recorder, a second portion depending from the first portion, and a third portion connected to the first portion by the second portion; said third portion including a center section substantially perpendicular to the line of sight of an observer and having a width substantially the same as the diameter of the marking wheel, and two reflecting sections extending from the plane of the center section at an angle of substantially 135°, the lower edge of each of the two reflecting sections being disposed substantially parallel with the recording surface and closely adjacent thereto to reflect to the observer an image of the contact point of the marker wheel with the recording surface.

References Cited in the file of this patent

UNITED STATES PATENTS

| | | |
|---|---|---|
| 15,033 | Logan | Mar. 3, 1868 |
| 270,530 | Whitesides | Jan. 9, 1883 |
| 481,055 | Plumtree | Aug. 16, 1892 |
| 2,473,231 | Wager | June 14, 1949 |